United States Patent
Lee (10) Patent No.: US 9,381,903 B2
(45) Date of Patent: Jul. 5, 2016

(54) VARIABLE CHANNEL TYPE FAN CLUTCH

(71) Applicant: Hyundai Motor Company, Seoul (KR)

(72) Inventor: Jaejin Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 14/103,379

(22) Filed: Dec. 11, 2013

(65) Prior Publication Data

US 2015/0072834 A1  Mar. 12, 2015

(30) Foreign Application Priority Data

Sep. 11, 2013 (KR) .................. 10-2013-0108918

(51) Int. Cl.
 *F16D 35/02* (2006.01)
 *B60W 10/02* (2006.01)
 *B60W 10/06* (2006.01)
 *F01P 7/04* (2006.01)

(52) U.S. Cl.
 CPC ............... *B60W 10/02* (2013.01); *B60W 10/06* (2013.01); *F01P 7/042* (2013.01); *F16D 35/021* (2013.01); *Y10T 477/735* (2015.01)

(58) Field of Classification Search
 CPC ... F16D 35/021; F16D 35/022; F16D 35/023; F16D 35/025
 See application file for complete search history.

(56) References Cited

U.S. PATENT DOCUMENTS

| | | | | |
|---|---|---|---|---|
| 3,135,370 A | * | 6/1964 | Sutton | F01P 7/042 123/41.12 |
| 4,086,987 A | * | 5/1978 | Riley | F16D 35/021 192/58.68 |
| 4,687,132 A | * | 8/1987 | Suzaki | F16D 35/021 123/41.12 |
| 2008/0023288 A1 | * | 1/2008 | Boyer | F16D 35/028 192/58.61 |
| 2010/0025177 A1 | * | 2/2010 | Fukushima | F16D 35/023 192/58.68 |

FOREIGN PATENT DOCUMENTS

| | | |
|---|---|---|
| JP | 1993-001033 U | 1/1993 |
| JP | 1993-027362 U | 4/1993 |
| JP | 2003-202036 A | 7/2003 |
| JP | 2007-278451 A | 10/2007 |
| KR | 1998-028802 A | 7/1998 |
| KR | 10-2004-0000080 A | 1/2004 |

* cited by examiner

*Primary Examiner* — Robert Hodge
*Assistant Examiner* — Ryan Dodd
(74) *Attorney, Agent, or Firm* — Morgan, Lewis & Bockius LLP (57) ABSTRACT

A variable channel type fan clutch apparatus may include a storage chamber and an operation chamber in which oil may be collected, wherein a fan clutch rotor may be interposed between the storage chamber and the operation chamber, an oil circulatory channel which fluid-connects the storage chamber and the operation chamber to circulate the oil therethrough, and a variable value which may be located in the oil circulatory channel, wherein the variable value may be configured to close the oil circulatory channel when an engine may be stopped or when a fan clutch exceeds an operation temperature, and wherein the variable value may be configured to open the oil circulatory channel when the engine may be operated or when the fan clutch does not exceed the operation temperature.

7 Claims, 12 Drawing Sheets

VARIABLE CHANNEL TYPE FAN CLUTCH

CROSS-REFERENCE TO RELATED APPLICATIONS

The present application claims priority to Korean Patent Application No. 10-2013-0108918, filed on Sep. 11, 2013, the entire contents of which is incorporated herein for all purposes by this reference.

BACKGROUND OF THE INVENTION

1. Field of the Invention

Exemplary embodiments of the present invention relate to a fan clutch and, more particularly, to an variable channel type fan clutch that automatically blocks an oil return hole that is a path for return and circulation of oil when an engine is stopped and when the fan clutch exceeds an operation temperature, thereby improving a cold start characteristic of the engine and operability of the fan clutch.

2. Description of Related Art

In general, a fan clutch constituting an engine cooling system along with a radiator and a cooling fan controls revolutions per minute (rpm) of the cooling fan depending on a temperature of cooling water.

Typically, the fan clutch is stopped when an engine is stopped, and is selectively driven depending on the temperature of the cooling water when the engine is driven. In this way, the fan clutch cooperates with the engine To this end, the fan clutch forms an oil circulating structure in which internal storage and operational chambers lead to an oil return hole, transmits a rotational force of a rotor based on a fluid viscous frictional force of the oil circulating therein, and has a valve for opening/closing an oil channel.

However, since the oil return hole of the fan clutch is controlled in a normally open mode, the oil has no way of flowing from the storage chamber to the operational chamber through the oil return hole even when the engine is stopped.

When the oil flows through the oil return hole, the oil flows at a low or high flow rate depending on a position of the oil return hole when the engine is stopped. In either case, when the engine is restarted, the fan clutch and the cooling fan are unnecessarily engaged due to the oil existing in the operational chamber.

Especially, this engagement leads to reducing a cold start characteristic and a start acceleration characteristic, and results in generating noise of the cooling fan.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an variable channel type fan clutch in which an oil return hole connecting between a storage chamber and an operation chamber is automatically closed when an engine is stopped, so that it is possible to prevent unnecessary engagement of the cooling fan that should be stopped, to improve a cold start characteristic and starting acceleratability, and to prevent noise of the cooling fan, and the oil return hole is automatically closed when the fan clutch exceeds its operation temperature, and a flow rate of the oil required when the cooling fan is operated is rapidly controlled to improve a response characteristic, so that it is possible to improve an engagement time and noise of the cooling fan and to improve vehicle fuel efficiency by increasing the operation temperature of the fan clutch.

Other objects and advantages of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In an aspect of the present invention, a variable channel type fan clutch apparatus, may include a storage chamber and an operation chamber in which oil is collected, wherein a fan clutch rotor is interposed between the storage chamber and the operation chamber, an oil circulatory channel which fluid-connects the storage chamber and the operation chamber to circulate the oil therethrough, and a variable value which is located in the oil circulatory channel, wherein the variable value is configured to close the oil circulatory channel when an engine is stopped or when a fan clutch exceeds an operation temperature, and wherein the variable value is configured to open the oil circulatory channel when the engine is operated or when the fan clutch does not exceed the operation temperature.

The oil circulatory channel may include an oil feed hole that forms a path along which the oil flows out of the storage chamber or returns to the storage chamber, and an oil return hole that is connected to the oil feed hole and communicates with the operation chamber, and the variable valve is located at a connection section between the oil feed hole and the oil return hole.

The variable valve is inserted into a valve hole extending from the oil feed hole to which the oil return hole is connected.

The variable valve may include a plunger that closes or opens the oil return hole, a return spring that elastically biases the plunger toward the oil return hole so that the plunger moves to the oil return hole when the engine is stopped, and a plunger shifter that is engaged to the plunger and is configured to apply a force to the plunger so that the plunger overcomes a centrifugal force of the fan clutch to move to the oil return hole when the fan clutch exceeds the operation temperature.

The plunger shifter is formed of wax undergoing thermal expansion, wherein the wax is configured to be expanded by heat transmitted from the fan clutch and applies a force to the plunger to move the plunger toward the oil return hole.

The wax may have a higher expansion temperature than the operation temperature reached when the fan clutch is operated.

The plunger shifter is connected to a bimetal, and the bimetal is deformed to apply a force to the plunger by heat at a higher temperature than the operation temperature reached to move the plunger toward the oil return hole when the fan clutch is operated.

The plunger shifter is formed of wax and is connected to an electronic actuator, and the electronic actuator expands the wax to apply a force to the plunger at a higher temperature than the operation temperature reached when the fan clutch is operated, so as to move the plunger toward the oil return hole.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
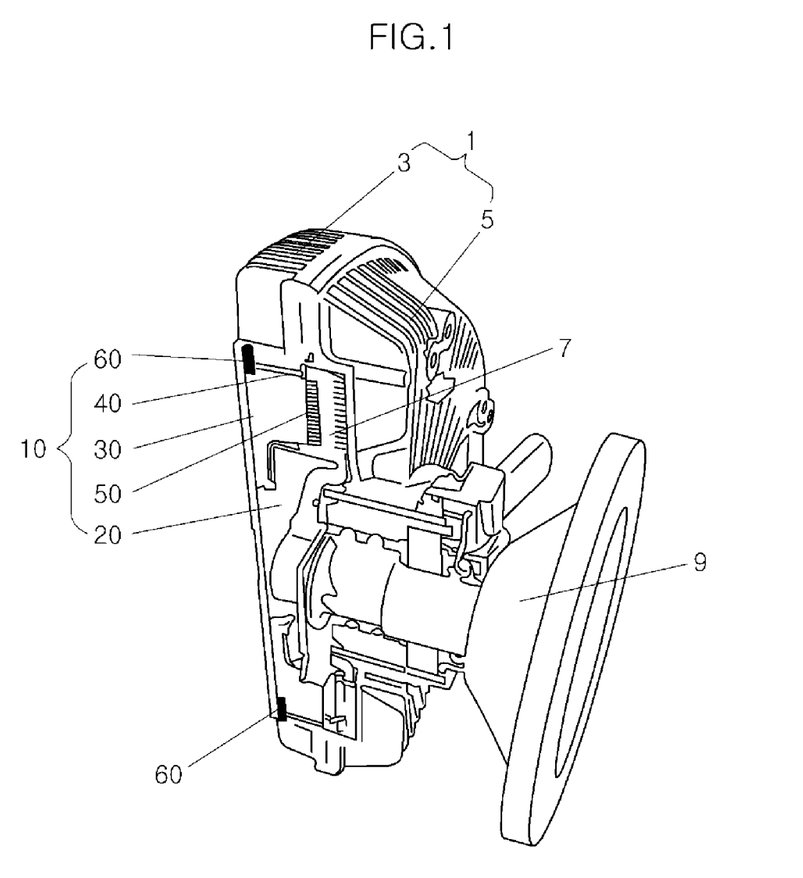
FIG. 1 shows a configuration of a variable channel type fan clutch according to the prevent invention.

FIG. 1 shows a configuration of a variable channel type fan clutch according to an exemplary embodiment of the prevent invention.

As shown in FIG. 1, a variable channel type fan clutch includes a fan clutch case 1 in which a fan clutch rotor 7 coupled to a fan clutch rotation shaft 9 is housed, and a variable channel 10 that forms an oil circulatory path in the fan clutch case 1 so as to transmit a rotational force of the fan clutch rotor 7 using a fluid viscous frictional force of oil.

The fan clutch case 1 is made up of an outer case 3 and an inner case 5. The fan clutch rotor 7 is located in an internal space defined by the outer case 3 and the inner case 5 coupled to each other. The fan clutch rotation shaft 9 is coupled with the fan clutch rotor 7 via a bearing. The fan clutch case 1, the fan clutch rotor 7, the fan clutch rotation shaft 9, and the bearing are typical components of the fan clutch.

The variable channel 10 is provided with a storage chamber 20 that forms a front space of the fan clutch rotor 7 so as to store the oil, and an operation chamber 50 that forms a rear space of the fan clutch rotor 7. An oil circulatory channel along which the oil flows from the storage chamber 20 to the operation chamber 50 or from the operation chamber 50 to the storage chamber 20 is provided. The variable channel 10 includes at least one wax type variable valve 60 that automatically closes the oil circulatory channel when an engine is stopped or when the fan clutch exceeds an operation temperature.

The storage chamber 20 is a space in which the oil is collected from the operation chamber 50 when the fan clutch is not operated. The operation chamber 50 is a space in which the oil is collected from the storage chamber 20 so as to transmit the rotational force of the fan clutch rotor 7 using the fluid viscous frictional force of oil when the fan clutch is operated.

The oil circulatory channel is made up of at least one oil feed hole 30 that communicates with the storage chamber 20 so as to form a path along which the oil flows out of the storage chamber 20 or returns to the storage chamber 20, and at least one oil return hole 40 that is connected to the oil feed hole 30 and communicates with the operation chamber 50.

In the present embodiment, the number of oil return holes 40 is preferably at least four, but may vary as needed.

The wax type variable valve 60 is installed on a joint so that the oil return hole 40 and the oil feed hole 30 communicate with each other, thereby releasing the connection between the oil return hole 40 and the oil feed hole 30 when the engine is stopped or when the fan clutch exceeds the operation temperature.

In the present embodiment, the number of wax type variable valves 60 is preferably at least four, but may vary as needed.

Typically, the operation temperature of the fan clutch is dependent on a specification of the fan clutch, and thus is not limited to a specific temperature value.

Figure 2:
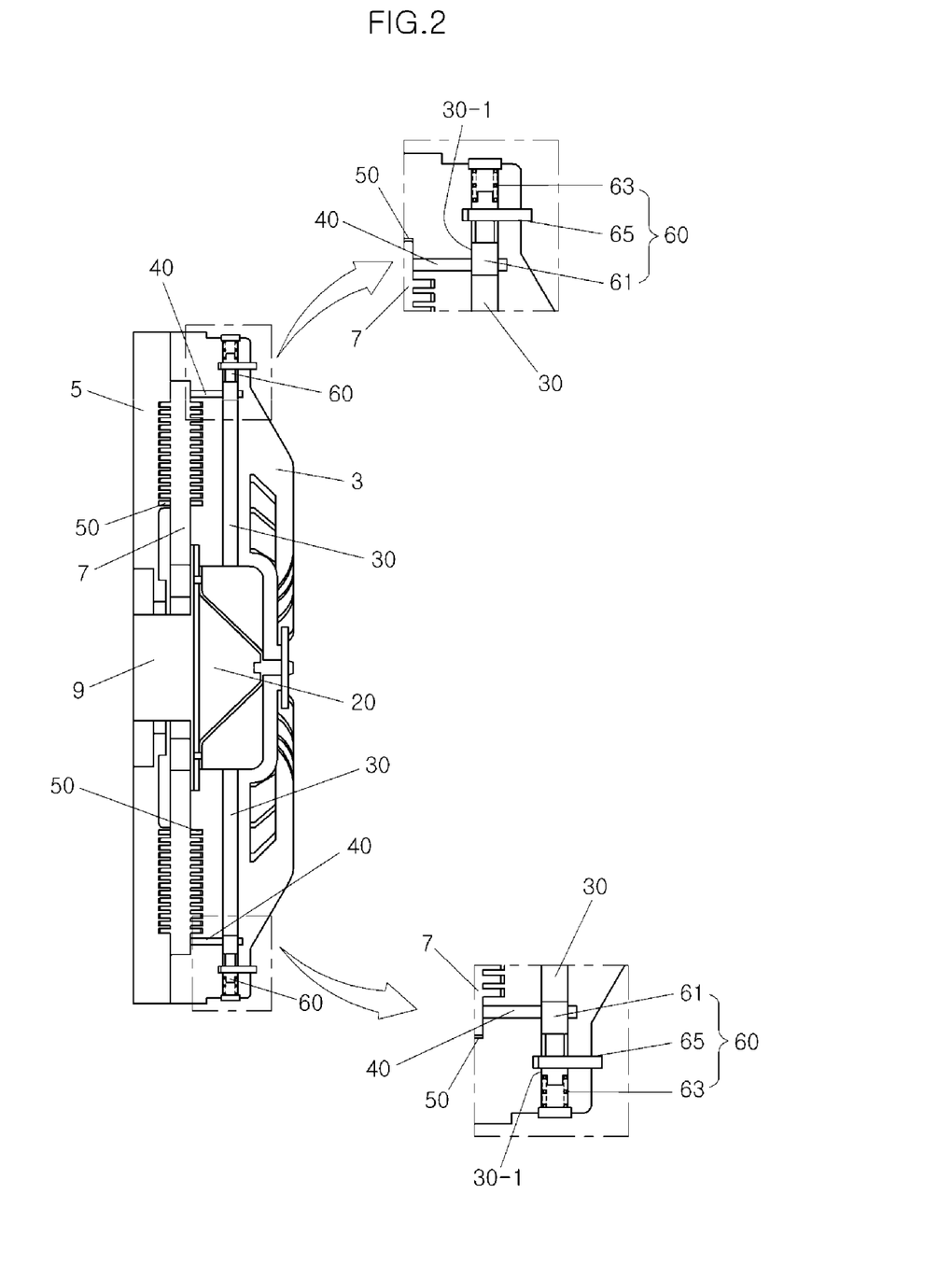
FIG. 2 shows a configuration of a wax type variable valve applied to a variable channel of the present invention.

Meanwhile, FIG. 2 shows a detailed configuration of the wax type variable valve 60 provided for the variable channel 10.

As shown in FIG. 2, the wax type variable valve 60 includes a plunger 61 that is housed in a valve hole 30-1 and closes or opens a section where the oil return hole 40 and the oil feed hole 30 communicate with each other, a return spring 63 that pushes the plunger 61 to close a communication section between the oil return hole 40 and the oil feed hole 30, and a plunger shifter 65 that the plunger 61 to close the communication section between the oil return hole 40 and the oil feed hole 30 when the engine is stopped or when the fan clutch reaches the operation temperature.

The valve hole 30-1 extends from the oil feed hole 30, and is formed along with the oil feed hole 30. Typically, on the basis of a position at which the oil return hole 40 is connected, a hole extending inside the fan clutch is referred to as the oil feed hole 30, and a hole extending outside the fan clutch is referred to as the valve hole 30-1.

The plunger 61 has a structure in which a stepped cross section is formed in a longitudinal direction, is fitted into the return spring 63 using a stepped section, and is connected to the plunger shifter 65 using another stepped section.

The return spring 63 is compressed by a centrifugal force caused by driving the fan clutch. As such, a modulus of the return spring 63 is set to be fitted to a magnitude of the centrifugal force.

Wax, which is a temperature reaction material that reacts on a temperature to push the plunger 61 due to an expansive force occurring above a given temperature, is applied to the plunger shifter 65. Alternatively, in place of the temperature reaction material, a bimetal or an electronic actuator associated with the temperature reaction material may be applied to the plunger shifter 65, which will be described below in detail.

Figure 3:
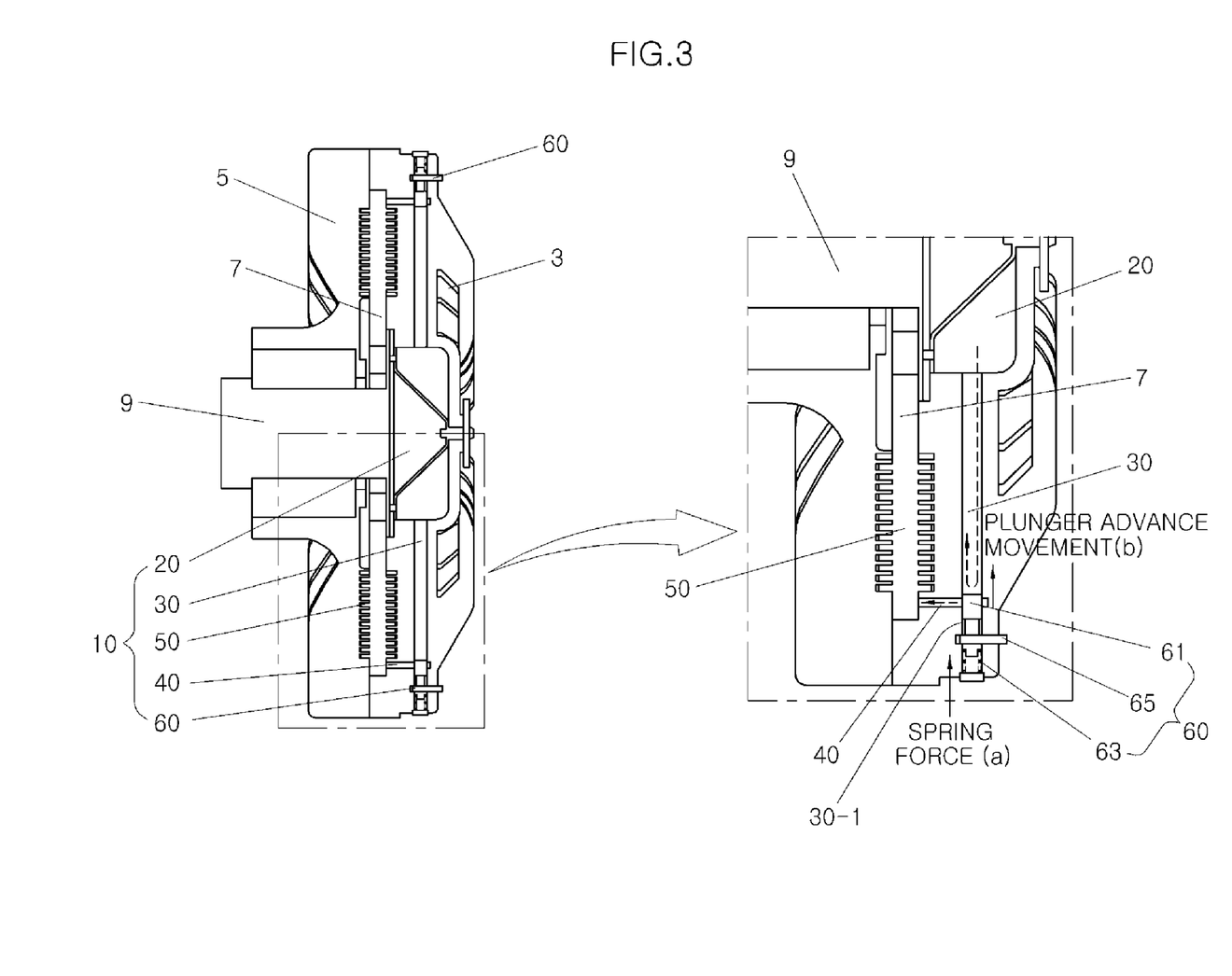
FIG. 3 shows a state in which the wax type variable valve according to an exemplary embodiment of the present invention closes the variable channel when an engine is stopped.

FIG. 3 shows a state in which, when the engine is stopped, the variable channel 10 of the fan clutch is closed by the wax type variable valve 60.

As shown in FIG. 3, when the engine is stopped, the communication section between the oil return hole 40 and the oil feed hole 30 is closed by the wax type variable valve 60. Thereby, the oil is prevented from flowing from the storage chamber 20 into the operation chamber 50. Therefore, when a cold start is carried out after the engine is stopped, rotation of the fan clutch is minimized or prevented. Thereby, it is possible to prevent unnecessary engagement of a cooling fan, a reduction in cold start characteristic and starting acceleratability, and noise of the cooling fan.

For example, as the engine is stopped, the magnitude of the centrifugal force of the fan clutch which is applied to the wax type variable valve 60 is reduced. As such, the return spring 63 overcoming the centrifugal force presses and pushes the plunger 61 (expressed as a spring force a), and the pushing of the plunger 61 (expressed as plunger advance movement b) leads to movement of the plunger 61 toward an interior of the fan clutch. Here, the wax does not yet reach its expansion temperature, and the plunger shifter 65 is not subjected to a force caused by expansion of the wax.

Due to the pushing of the plunger 61, the communication section between the oil feed hole 30 and the oil return hole 40 is closed by the plunger 61. Thereby, it is possible to close an oil flow path formed by the storage chamber 20, the oil feed hole 30, and the oil return hole 40.

Figure 4:
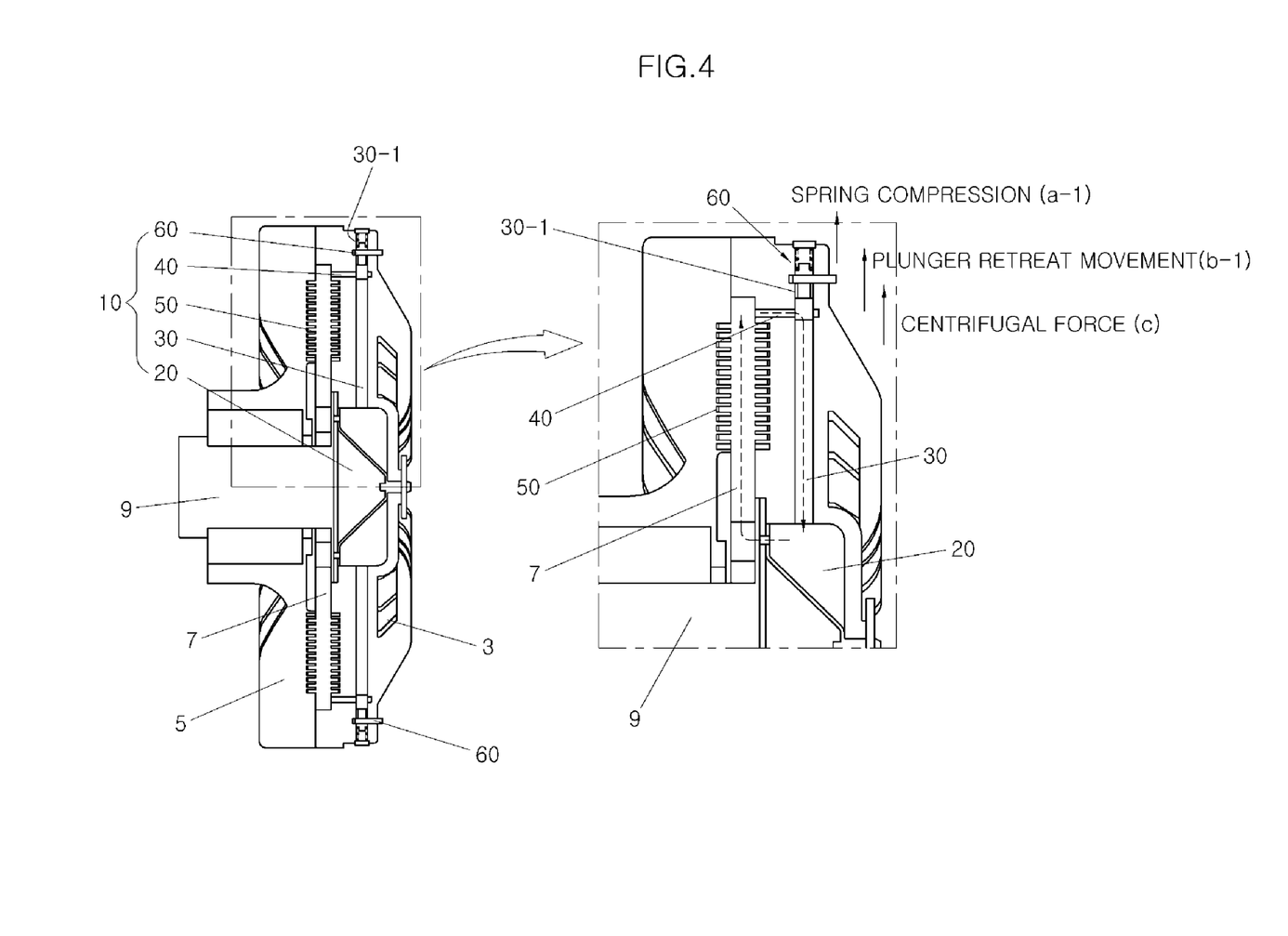
FIG. 4 shows a state in which the wax type variable valve according to an exemplary embodiment of the present invention opens the variable channel when an engine is stopped.

FIG. 4 shows a state in which, when the engine is operated, the variable channel 10 of the fan clutch is opened by the wax type variable valve 60.

As shown in FIG. 4, when the engine is operated, the communication section between the oil return hole 40 and the oil feed hole 30 is not closed by the wax type variable valve 60. Thereby, the oil can flow from the storage chamber 20 into the operation chamber 50. Therefore, when the engine is driven, the cooling fan can be normally operated in synchronization with revolutions per minute (rpm).

For example, as the engine is operated, the magnitude of the centrifugal force c of the fan clutch which is applied to the wax type variable valve 60 is increased. Due to the centrifugal force c, the plunger 61 is pushed outside the fan clutch (expressed as plunger retreat movement b-1), and the return spring 63 is compressed by the plunger 61 pushed outward (expressed as spring compression a-1). Here, the wax does not yet reach its expansion temperature, and the plunger shifter 65 is not subjected to a force caused by expansion of the wax.

Due to the outward pushing of the plunger 61, the communication section between the oil feed hole 30 and the oil return hole 40 is not closed by the plunger 61. As a result, the oil flows from the storage chamber 20 past the oil feed hole 30 and the oil return hole 40 into the operation chamber 50. Thereby, the fan clutch rotor 7 can be converted into a state in which the rotational force thereof is transmitted by the fluid viscous frictional force.

Figure 5:
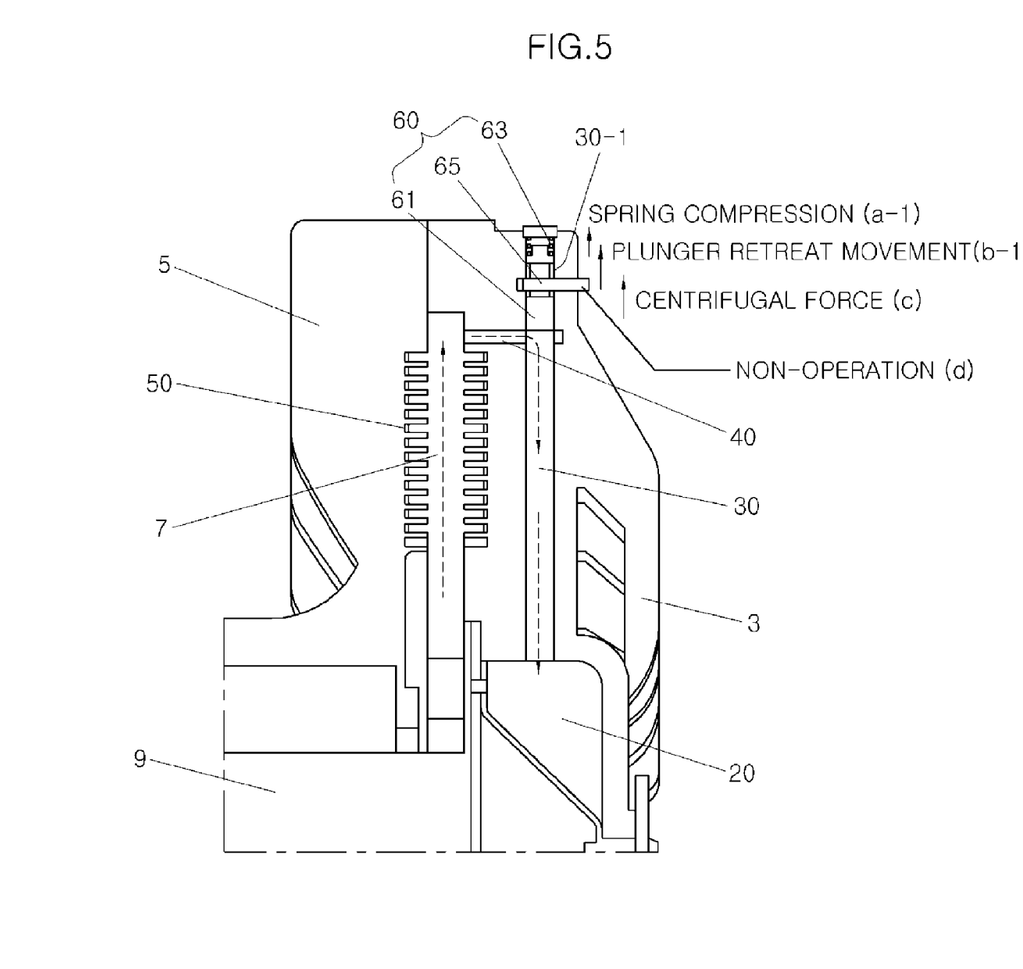
FIG. 5 shows a state in which the wax type variable valve according to an exemplary embodiment of the present invention opens the variable channel when the fan clutch does not exceed an operational temperature.

FIG. 5 shows a state in which, when the fan clutch does not exceed the operation temperature, the variable channel 10 of the fan clutch is opened by closure of the wax type variable valve 60 and by non-operation of the plunger shifter 65.

As shown in FIG. 5, when the fan clutch does not exceed the operation temperature, the wax type variable valve 60 is converted into a closed state, but the oil return hole 40 is kept open.

This is caused by a process in which the centrifugal force c increased by the operation of the fan clutch along with the operation of the engine pushes the plunger 61 out of the fan clutch (expressed as plunger retreat movement b-1), and the return spring 63 is compressed by the pushed plunger 61 (expressed as spring compression a-1), and thereby the communication section between the oil feed hole 30 and the oil return hole 40 is opened. Here, the wax does not yet reach its expansion temperature, and the plunger shifter 65 is not subjected to a force caused by expansion of the wax.

As a result, the oil flows from the storage chamber 20 past the oil feed hole 30 and the oil return hole 40 into the operation chamber 50. Thereby, the fan clutch rotor 7 can be converted into a state in which the rotational force thereof is transmitted by the fluid viscous frictional force.

Figure 6:
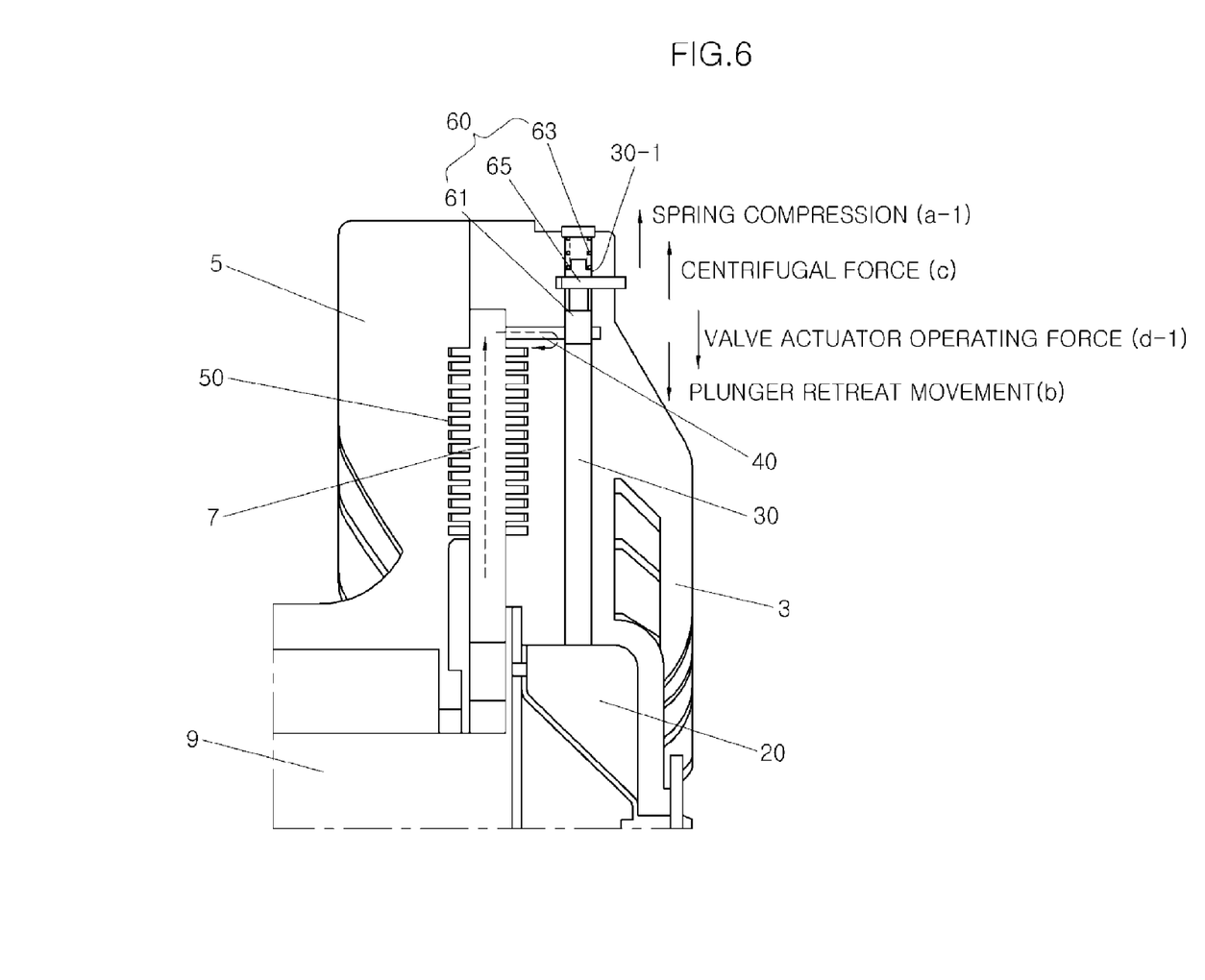
FIG. 6 shows a state in which the wax type variable valve according to an exemplary embodiment of the present invention closes the variable channel when the fan clutch exceeds the operational temperature.

FIG. 6 shows a state in which, when the fan clutch exceeds the operation temperature, the variable channel 10 of the fan clutch is closed by opening of the wax type variable valve 60 and by operation of the plunger shifter 65.

As shown in FIG. 6, when the fan clutch exceeds the operation temperature, the plunger 61 and the return spring 63 receive the centrifugal force c of the fan clutch without a loss. However, due to the operation temperature of the fan clutch, the wax is expanded. As the wax is expanded, the plunger shifter 65 is converted into an operated state (expressed as valve actuator operating force d-1).

For this reason, the plunger 61 is pressed by the plunger shifter 65. Thereby, the plunger 61 can move inside the fan clutch (expressed as plunger advance movement b).

Therefore, the plunger 61 closes the communication section between the oil feed hole 30 and the oil return hole 40. Thereby, it is possible to close an oil flow path formed by the storage chamber 20, the oil feed hole 30, and the oil return hole 40.

Especially, due to this process, when the fan clutch exceeds the operation temperature, the oil return hole 40 can be tightly closed. When the engagement between the fan clutch and the cooling fan is required, the oil can be rapidly introduced into the operation chamber 50. Here, a time required for the engagement between the fan clutch and the cooling fan is dependent on diameter sizes of the oil feed hole 30 and the oil return hole 40 to which the oil is fed.

Figure 7A:
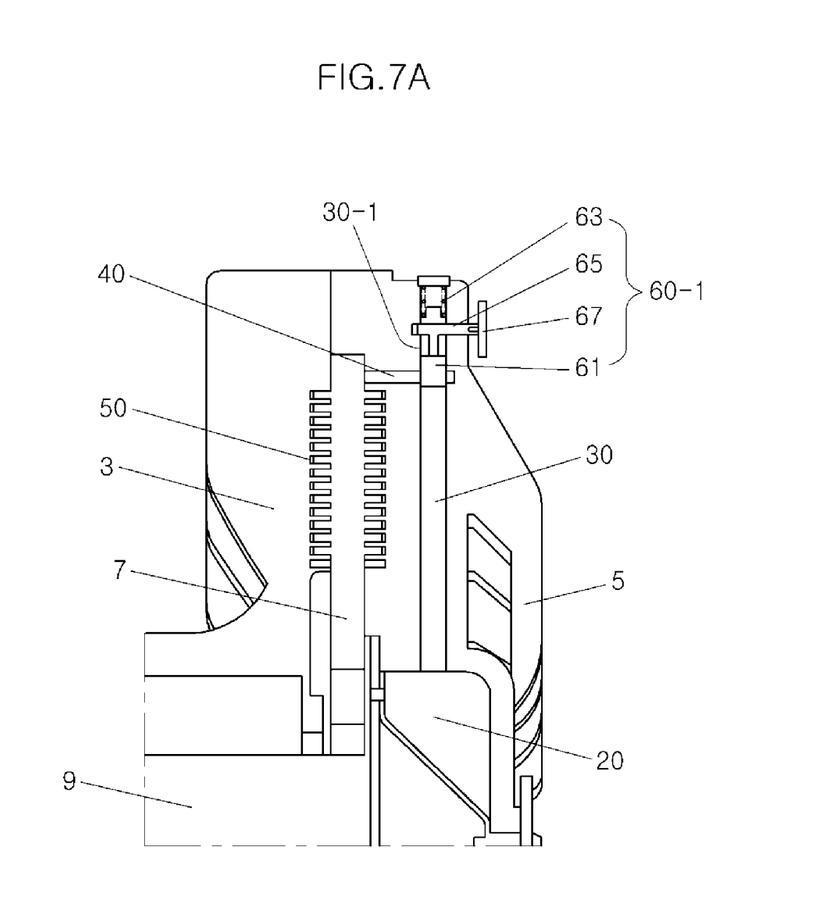
FIGS. 7A and 7B show an example in which the wax type variable valve according to an exemplary embodiment of the present invention is modified into a bimetal type variable valve or a wax-electronic variable valve.
Figure 7B:
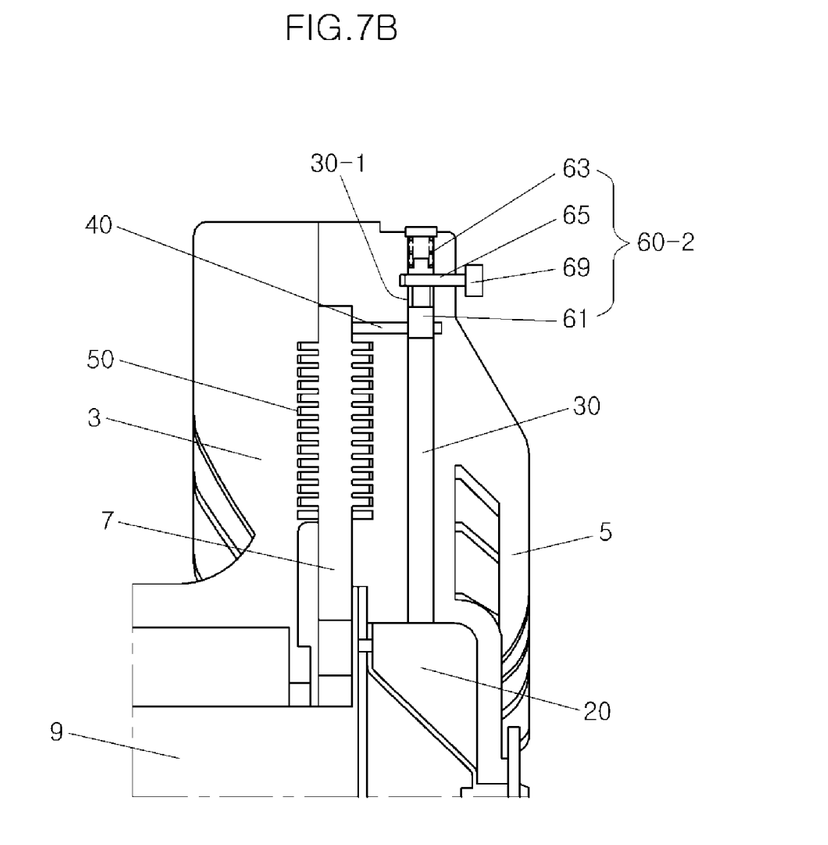

FIGS. 7A and 7B show a modification of the wax type variable valve 60 that has various configurations and is described based on FIGS. 1 to 6.

FIG. 7A shows a bimetal type variable valve 60-1. The bimetal type variable valve 60-1 includes a plunger 61, a return spring 63, a plunger shifter 65, and a bimetal 67 connected to the plunger shifter 65, and is partly different in configuration from the wax type variable valve 60 in which the plunger shifter 65 is formed of wax.

In this case, the bimetal 67 is deformed by a temperature when the fan clutch exceeds its operation temperature. Thereby, the plunger shifter 65 is pushed inside the fan clutch, and the pushed plunger shifter 65 is located at a connection section between the oil feed hole 30 and the oil return hole 40. Thus, the oil return hole 40 can be tightly closed.

In the present embodiment, the bimetal 67 is deformed to apply a rotational force or a pressing force to the plunger shifter 65. To this end, a typical method is applied.

FIG. 7B shows a wax-electronic variable valve 60-2. The wax-electronic variable valve 60-2 includes a plunger 61, a return spring 63, a wax type plunger shifter 65, and an electronic actuator 69 connected to the plunger shifter 65, and is partly different in configuration from the wax type variable valve 60 or the bimetal type variable valve 60-1 based on the bimetal.

In this case, the electronic actuator 69 is operated when the fan clutch exceeds its operation temperature. Thereby, the plunger shifter 65 is pushed inside the fan clutch, and the pushed plunger shifter 65 is located at a connection section between the oil feed hole 30 and the oil return hole 40. Thus, the oil return hole 40 can be tightly closed.

In the present embodiment, the electronic actuator 69 is a component that directly applies heat of a hot wire to wax of the plunger shifter 65, exposes heat of the fan clutch to the wax of the plunger shifter 65, or generates an electric signal according to a detected temperature to transmit it to the wax of the plunger shifter 65. To this end, a typical method is applied.

Figure 8A:
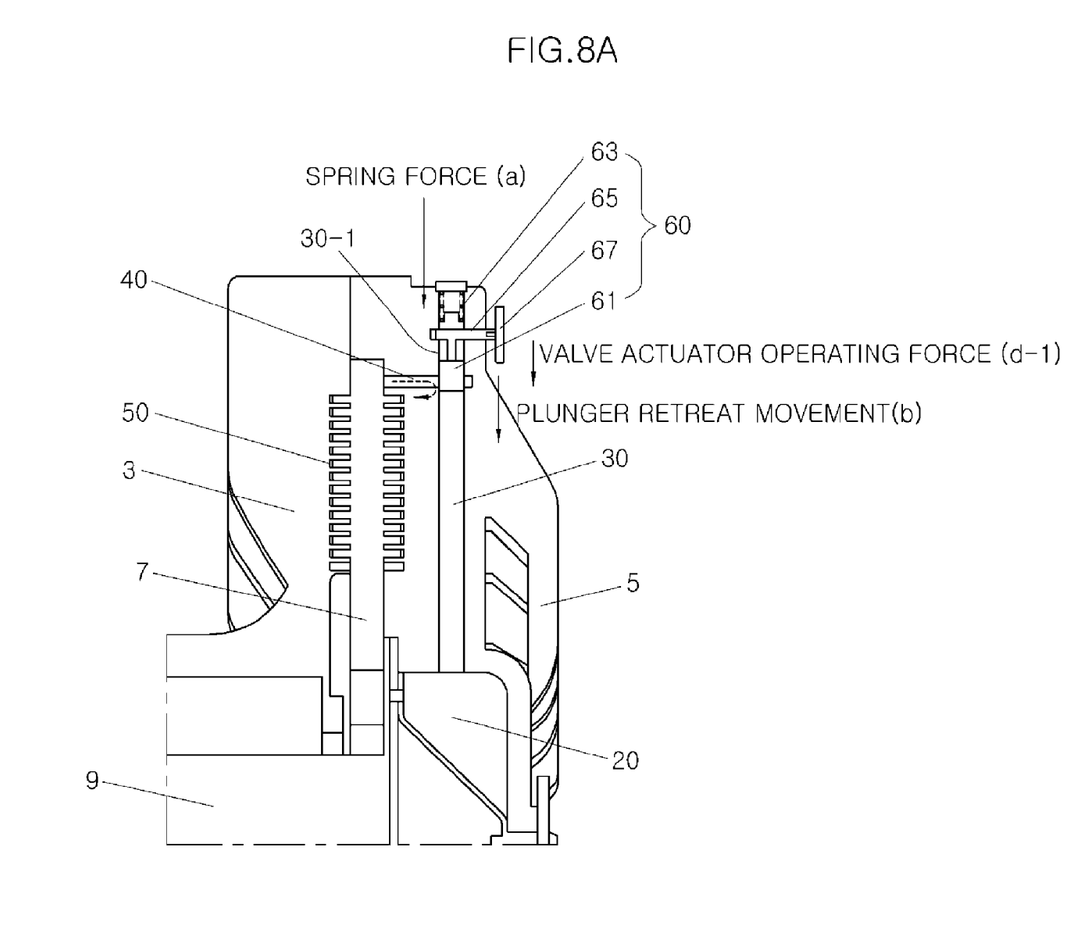
FIGS. 8A and 8B show a state in which the bimetal type variable valve or the wax-electronic variable valve according to an exemplary embodiment of the present invention closes the variable channel when the engine is stopped and when the fan clutch exceeds the operational temperature.

FIG. 8A shows a state in which, when the engine is stopped or the fan clutch exceeds its operation temperature, the variable channel 10 of the fan clutch is closed by operation of the bimetal type variable valve 60-1. This operation is the same as in FIGS. 3 and 6, but is merely different in that the deformation of the bimetal 67 acts on the plunger shifter 65.

For example, when the engine is stopped, the bimetal 67 is not operated, and thus the same operation as in FIGS. 3 and 6 is performed. In contrast, when the fan clutch exceeds its operation temperature, a pressing force which the plunger shifter 65 receives from the bimetal 67 (expressed as valve actuator operating force d-1) is applied to the plunger 61 with a greater force than the centrifugal force of the fan clutch. Thereby, the plunger 61 can move inside the fan clutch (expressed as plunger forward movement b).

Therefore, the bimetal type variable valve 60-1 using the plunger shifter 65 and the bimetal 67 can close an oil flow path formed by the storage chamber 20, the oil feed hole 30, and the oil return hole 40.

Figure 8B:
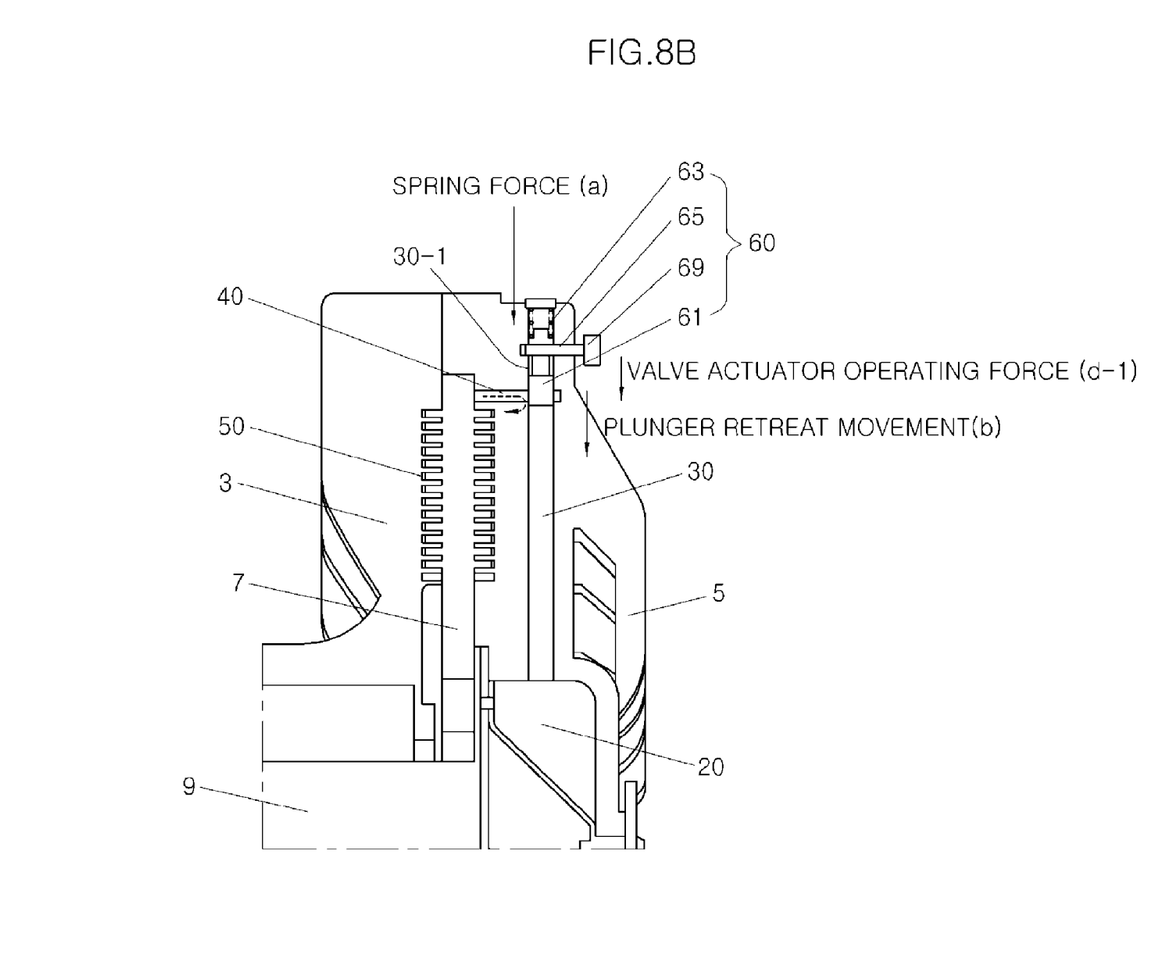

FIG. 8B shows a state in which, when the engine is stopped or the fan clutch exceeds its operation temperature, the variable channel 10 of the fan clutch is closed by operation of the wax-electronic variable valve 60-2. This operation is the same as in FIGS. 3, 6, and 8A, but is merely different in that the electronic actuator 69 shifts the plunger shifter 65.

For example, when the engine is stopped, the electronic actuator 69 is not operated, and thus the same operation as in FIGS. 3, 6, and 8A is performed. In contrast, when the fan clutch exceeds its operation temperature, the plunger shifter 65 operated together with the electronic actuator 69 generates a greater force than the centrifugal force of the fan clutch (expressed as valve actuator operating force d-1). Thereby, the plunger 61 can move inside the fan clutch (expressed as plunger forward movement b).

Therefore, the wax-electronic variable valve 60-2 using the plunger shifter 65 and the electronic actuator 69 can close an oil flow path formed by the storage chamber 20, the oil feed hole 30, and the oil return hole 40.

Figure 9A:
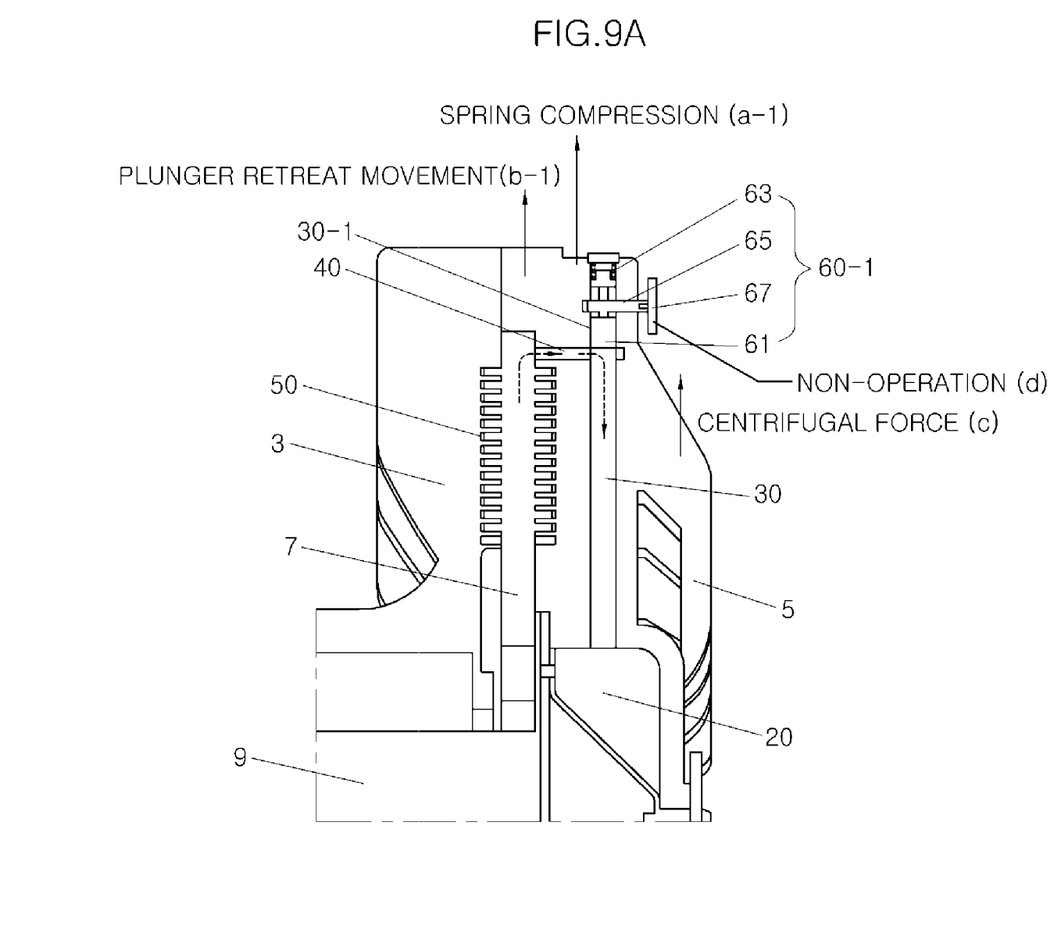
FIGS. 9A and 9B show a state in which the bimetal type variable valve or the wax-electronic variable valve according to an exemplary embodiment of the present invention opens the variable channel when the engine is driven and when the fan clutch does not exceed the operational temperature.
Figure 9B:
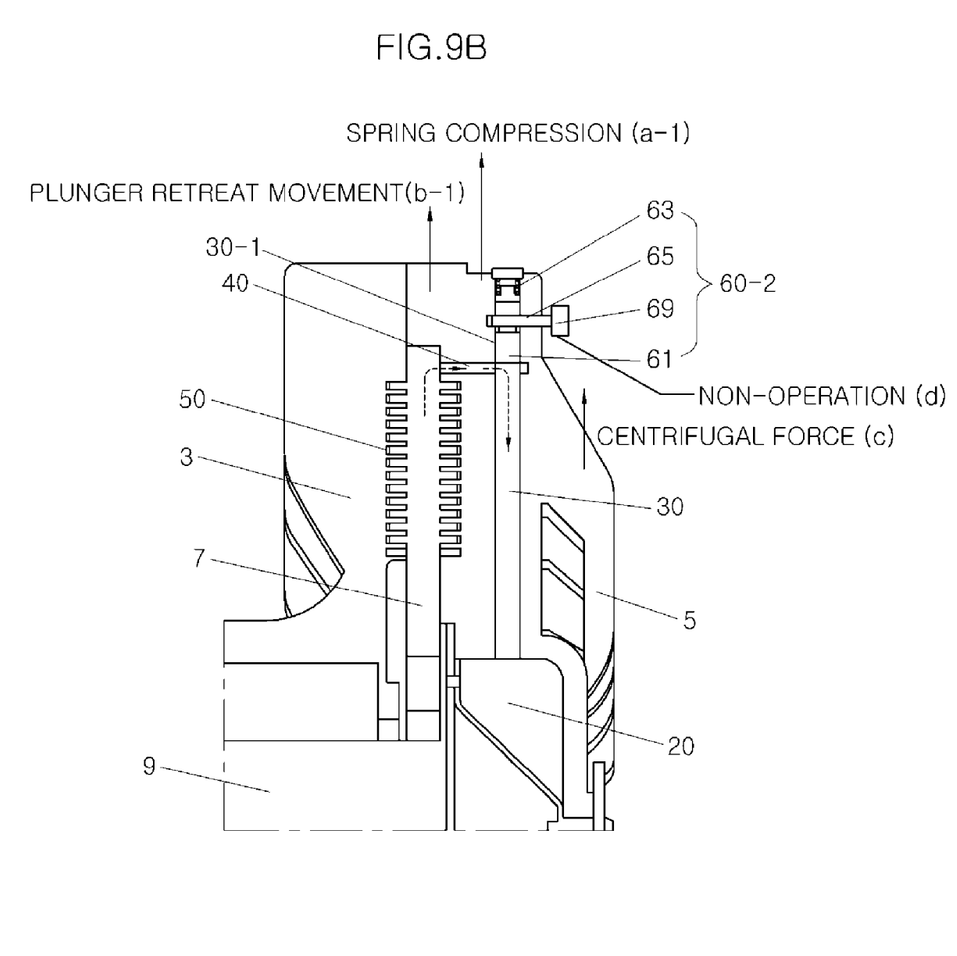

FIG. 9A shows an operation of the bimetal type variable valve 60-1 when the engine is operated or when the fan clutch does not exceed its operation temperature, and FIG. 9B shows an operation of the wax-electronic variable valve 60-2 when the engine is operated or when the fan clutch does not exceed its operation temperature.

As shown, it can be found that an operation of the bimetal type variable valve 60-1 of FIG. 9A and an operation of the wax-electronic variable valve 60-2 of FIG. 9B are the same as in FIGS. 4 and 5 where the wax type plunger shifter 65 is not operated. This is because, the bimetal 67 or the electronic actuator 69 is not operated, and thus the plunger shifter 65 is not shifted.

As described above, in the variable channel type fan clutch according to the present embodiment, the storage chamber 20 and the operation chamber 50 in which the oil transmitting the rotational force of the fan clutch rotor 7 using the fluid viscous frictional force is collected are formed, and the oil circulatory channel which connects the storage chamber 20 and the operation chamber 50 and along which the oil circulates is formed. The variable valve 60, 60-1, or 60-2 having the plunger 61 shifted by the force received from each of the return spring 63 and the plunger shifter 65 is located in the oil circulatory channel. Thereby, when the engine is stopped, the plunger shifter 65 closes the oil circulatory channel, so that it is possible to prevent a reduction in cold start characteristic and starting acceleratability, and noise of the cooling fan. Particularly, when the fan clutch exceeds its operation temperature, the plunger shifter 65 closes the oil circulatory channel, and thus the oil is not substantially introduced into the operation chamber 50, so that fan clutch operability as well as vehicle fuel efficiency is improved.

When the engine is stopped, a phenomenon that the oil is unnecessarily introduced into the operation chamber is substantially prevented by automatically closing the oil return hole. Thereby, it is possible to prevent unnecessary engagement of the cooling fan that should be stopped, to improve a cold start characteristic and starting acceleratability, and to prevent noise of the cooling fan.

Further, when the fan clutch exceeds its operation temperature, the oil return hole is automatically closed, and a flow rate of the oil required when the cooling fan is operated is rapidly controlled to improve a response characteristic. Thus, it is possible to improve an engagement time and noise of the cooling fan.

In addition, the oil return hole is automatically closed based on the operation temperature of the fan clutch. Thereby, when the operation temperature of the fan clutch is increased, the number of operations of the fan clutch and the cooling fan can be reduced, and the resulting vehicle fuel efficiency is improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable channel type fan clutch apparatus, comprising:
   a storage chamber and an operation chamber in which oil is collected, wherein a fan clutch rotor is interposed between the storage chamber and the operation chamber;
   an oil circulatory channel which fluid-connects the storage chamber and the operation chamber to circulate the oil therethrough; and
   a variable valve which is located in the oil circulatory channel,
   wherein the variable valve is configured to close the oil circulatory channel when an engine is stopped and when a fan clutch exceeds an operation temperature,
   wherein the variable valve is configured to open the oil circulatory channel when the engine is operated or when the fan clutch does not exceed the operation temperature,
   wherein the variable valve includes:
      a plunger closing or opening an oil return hole;
      a return spring elastically biasing the plunger toward the oil return hole so that the plunger moves to the oil return hole when the engine is stopped; and
      a plunger shifter engaged to the plunger and configured to apply a force to the plunger so that the plunger overcomes a centrifugal force of the fan clutch to move to the oil return hole when the fan clutch exceeds the operation temperature,
   wherein the plunger is inserted into a valve hole to which the oil return hole is connected, and
   wherein the plunger includes a stepped cross section having a first stepped section and a second stepped section formed in a longitudinal direction of the plunger, the first stepped section fitted into the return spring and the second stepped section directly engaged to the plunger shifter.

2. The variable channel type fan clutch apparatus of claim 1,
   wherein the oil circulatory channel includes:
      an oil feed hole forming a path along which the oil flows out of the storage chamber or returns to the storage chamber; and
      the oil return hole connected to the oil feed hole and communicating with the operation chamber; and
   wherein the variable valve is located at a connection section between the oil feed hole and the oil return hole.

3. The variable channel type fan clutch apparatus of claim 2, wherein the valve hole extends from the oil feed hole to which the oil return hole is connected.

4. The variable channel type fan clutch apparatus of claim 1,
   wherein the plunger shifter is formed of wax undergoing thermal expansion, and
   wherein the wax is configured to be expanded by heat transmitted from the fan clutch and applies a force to the plunger to move the plunger toward the oil return hole.

5. The variable channel type fan clutch apparatus of claim 4, wherein the wax has a higher expansion temperature than the operation temperature reached when the fan clutch is operated.

6. The variable channel type fan clutch apparatus of claim 4,
   wherein the plunger shifter is connected to a bimetal, and
   wherein the bimetal is deformed to apply a force to the plunger by heat at a higher temperature than the operation temperature reached to move the plunger toward the oil return hole when the fan clutch is operated.

7. The variable channel type fan clutch apparatus of claim 4,
   wherein the plunger shifter is formed of wax and is connected to an electronic actuator, and
   wherein the electronic actuator expands the wax to apply a force to the plunger at a higher temperature than the operation temperature reached when the fan clutch is operated, so as to move the plunger toward the oil return hole.

* * * * *